United States Patent
Mitani

(10) Patent No.: US 7,042,595 B2
(45) Date of Patent: May 9, 2006

(54) COMMUNICATION TERMINAL APPARATUS

(75) Inventor: Masateru Mitani, Kawasaki (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 909 days.

(21) Appl. No.: 09/988,012

(22) Filed: Nov. 16, 2001

(65) Prior Publication Data

US 2003/0095289 A1    May 22, 2003

(51) Int. Cl.
*H04N 1/00*    (2006.01)
(52) U.S. Cl. .................... 358/402; 358/1.15; 358/403; 358/405
(58) Field of Classification Search .............. 358/402, 358/403, 405, 1.15
See application file for complete search history.

(56) References Cited

U.S. PATENT DOCUMENTS

| | | | |
|---|---|---|---|
| 6,249,356 B1* | 6/2001 | Yoshikawa et al. | 358/402 |
| 6,529,293 B1* | 3/2003 | Otsuka | 358/434 |
| 2002/0051146 A1* | 5/2002 | Tanimoto | 358/1.9 |
| 2002/0051170 A1* | 5/2002 | Kuwahara et al. | 358/1.15 |
| 2002/0118397 A1* | 8/2002 | Maruyama | 358/405 |

FOREIGN PATENT DOCUMENTS

JP    2000-151961    *    5/2000

* cited by examiner

*Primary Examiner*—Kimberly Williams
*Assistant Examiner*—Michael Burleson
(74) *Attorney, Agent, or Firm*—Foley & Lardner LLP

(57) ABSTRACT

In a mailbox information table, respective processing is registered in a way to correspond to each subaddress of an F code. Image data of a facsimile with an attached F code containing a subaddress registered in the information table is stored in a corresponding mailbox in a mailbox group. A special mailbox table stores a processing corresponding to a facsimile with an attached F code having a subaddress not registered in the information table. If the subaddress in the attached F code of a received facsimile is not registered in the information table, the image data of that facsimile is stored in a special mailbox. After this, the processing which is registered for the special mailbox is performed.

8 Claims, 3 Drawing Sheets

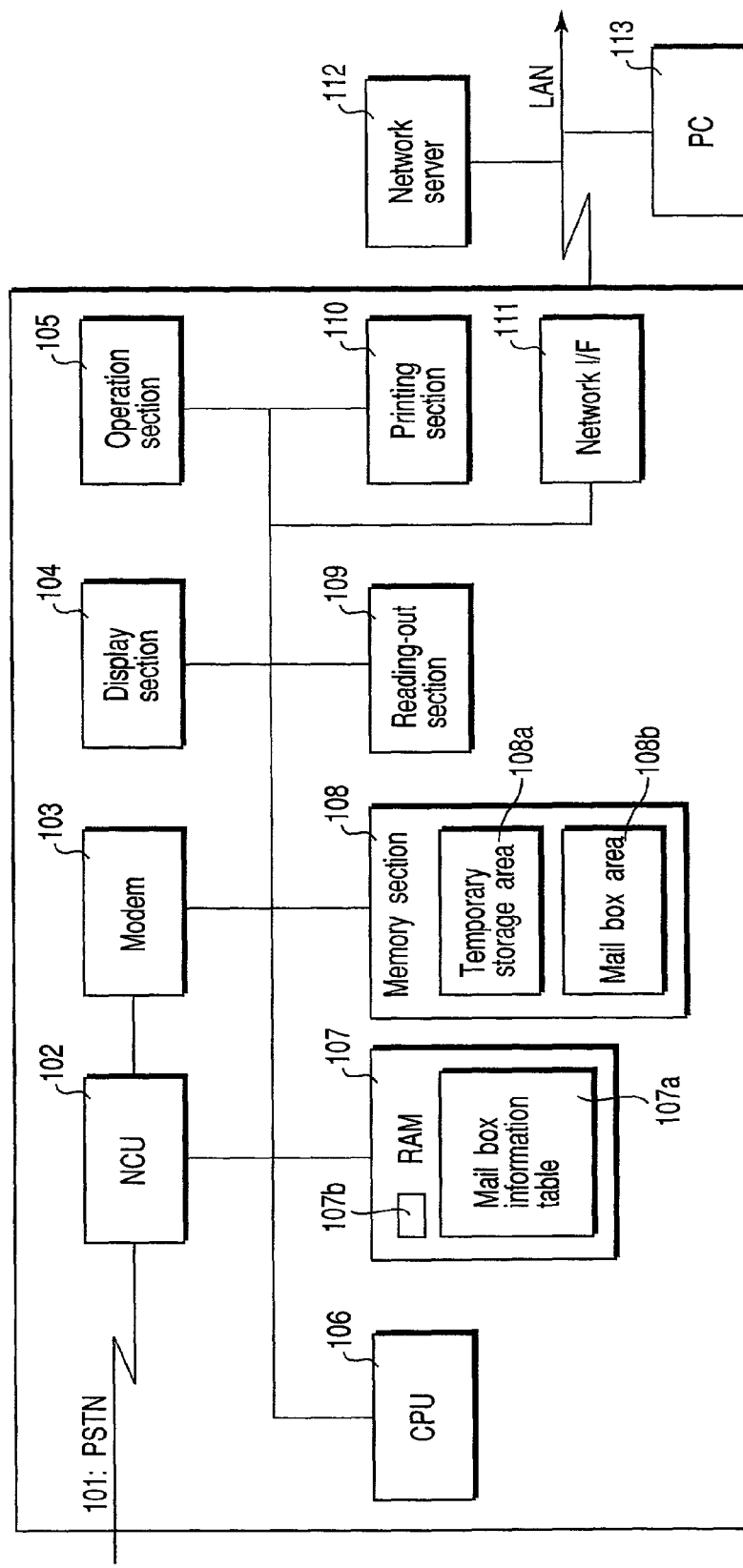
F I G. 1

| Registration number | Subaddress | Password | Process type | Process - type information |
|---|---|---|---|---|
| 1 | Any others | Any others | Bulletin board | |
| 2 | 001 | | Bulletin board | |
| 3 | 22222 | 12345 | Confidential | |
| 4 | 3322 | | Forwarding | 0122 |
| 5 | ...... | ...... | Network retaining | ...... |

COMMUNICATION TERMINAL APPARATUS

BACKGROUND OF THE INVENTION

A communication terminal apparatus, such as a conventional facsimile transmission/reception apparatus, is such that, upon receipt of any facsimile, the image data is promptly printed. In recent years, a communication terminal apparatus having not only the conventional facsimile function but also an F-code-attached facsimile processing function for performing processing based on an F code transmitted with the facsimile data has come into use.

In a communication terminal apparatus having such facsimile functions, respective mailbox areas corresponding to a subaddress contained in each F code are provided as storage areas for respective received facsimiles (image data) in a storage section such as a hard disk drive. The subaddress is used, on the transmission of a facsimile, as a numerical value set next to an ordinary facsimile number on the transmit side and sent as such, and functions as an extension number. Upon receipt of an F-code-attached facsimile, the image data is retained in a mailbox corresponding to the subaddress in the F code. After that, a function designated by the F code is performed. As such functions, there are a "bulletin board" function, a "confidential" function, etc.

In the case where the "bulletin board" function is designated by the F code, the image data stored in the mailbox can be printed, by anyone, using the facsimile apparatus. In the case where the "confidential" function is designated, authentication processing is performed with the use of a password and only a specific user can print the image data using of the facsimile apparatus.

Of the apparatuses having such functions, some apparatuses are of such a type that, at the start of receiving an F-code-attached facsimile, checking is done to see whether or not a subaddress and a password in the received F code are registered on the receiving machine and, if it is not registered, the image data is not received.

In a communication terminal apparatus of Jpn. Pat. Appln. KOKAI Publication No. 2000-151961, on the other hand, when an F-code-attached facsimile is received, checking is made to see whether or not any mailbox to which a subaddress and a password in the received F code correspond, is registered in the receiving machine and, if it is not registered, a mailbox having a corresponding subaddress and password is automatically created and, by doing so, the received image data is stored in the mailbox. Thus, the communication terminal apparatus of this publication can receive any facsimile with an attached F code having a subaddress and password not registered on the receiving machine.

In the apparatus of this publication, each time a facsimile with an F code having a subaddress and password not registered in the receiving machine is received, a mailbox having that subaddress and password is created. Therefore, in the case where, facsimiles are transmitted with its subaddress or password incorrectly set on the transmit sides for example, the number of mailboxes involving such incorrect subaddresses or passwords is unduly increased at a communication terminal apparatus and not noticed by the user. Normally, there is an upper limit on the number of mailboxes creatable on a single communication terminal apparatus and its upper limit is reached without the user being aware of it, thus presenting a problem.

SUMMARY OF THE INVENTION

It is accordingly the object of the present invention to provide a communication terminal apparatus for a facsimile which, when a request is made for it to receive a facsimile with an attached F code having a subaddress and password not registered on a receiving machine, can receive and retain such a facsimile without the need to newly create a mailbox and perform a function designated by the F code.

In order to achieve the above object, according to one aspect the present invention, there is provided a communication terminal apparatus for receiving a facsimile with an attached F code containing a subaddress and performing processing corresponding to the subaddress, comprising a first corresponding table which has respective registered processing corresponding to a respective subaddress; a plurality of first storage boxes which stores image data of a facsimile with an attached F code containing a subaddress registered in the first corresponding table; a second corresponding table which contains registered "processing" corresponding to a facsimile with an attached F code having a subaddress not registered in the first corresponding table; a second storage box which stores image data of the facsimile with an attached F code having a subaddress not registered in the first corresponding table; a receiving section which receives a facsimile via a communication circuit; a temporary storage section which temporarily stores the facsimile received by the receiving section; a first deciding section which decides whether or not any F code is contained in the facsimile stored in the temporary storage section; a second deciding section which, if the F code is contained in the facsimile, decides whether or not a subaddress in the F code is registered in the first corresponding table; a storage section which, if a subaddress in the F code is not registered in the first corresponding table, stores the image data of the facsimile in the second storage box; and a performing section which performs the processing registered in the second corresponding table with respect to the image data stored in the second storage box.

By thus initially providing a mailbox not having any special subaddress and password so as to allow a facsimile with an attached F code having an unregistered subaddress and password to be received, it is possible to prevent the number of mailboxes from being unduly increased.

BRIEF DESCRIPTION OF THE DRAWINGS

FIG. 1 is a block diagram showing a hardware structure of a facsimile transmission/reception apparatus according to the present invention;

FIG. 2 is a view showing a practical arrangement of a mailbox information table 107a;

FIG. 3 is a view showing an arrangement of a memory section; and

DETAILED DESCRIPTION OF THE EMBODIMENTS

Figures 2, 3:
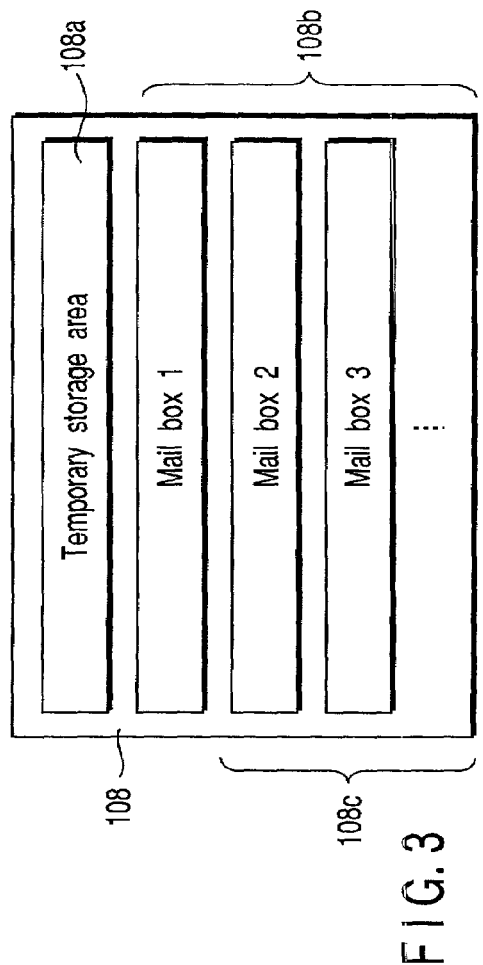

FIG. 1 is a block diagram showing a hardware structure of a facsimile transmission/reception apparatus 100 according to the present invention.

A public switched telephone network (PSTN) 101 comprises a facsimile data communication circuit connecting together the present apparatus and an external facsimile transmission/reception apparatus.

An network control unit (NCU) 102 is comprised of hardware having the function of performing an opening and a closing operation of a PSTN alternating current loop, that is, a two-way communication circuit, etc., which connects a modem 103 to the PSTN when a facsimile incoming request is made from the PSTN or a facsimile is to be transmitted from the present apparatus to the public network.

The modem 103 allows analog data which is received from the PSTN to be converted to digital data that can be handled by the present invention or, conversely, digital data to be converted to analog data when data is to be transmitted from the present apparatus to the PSTN.

A display section 104 comprises hardware for displaying the state of the present apparatus and the setting contents and state of a transmitted/received facsimile. An operation section 105 comprises hardware constituted by a numeric keypad, decision buttons, etc., necessary for the operation of the present invention. A CPU 106 comprises hardware for controlling, image processing, etc., of those respective blocks constituting the present apparatus.

A storage section 108 comprises hardware used mainly for retaining image data, for example, a hard disk drive, and including a temporary storage area 108a and mailbox area 108b. As will be set out by referring to FIG. 3, a plurality of mailboxes are provided in the mailbox area 108b. When an F-code-attached facsimile is received, image data of the facsimile is not immediately printed, but is stored in one of the mailboxes corresponding to the F code. This is followed by processing which is decided by the F code.

A RAM 107 comprises of a collection of hardware constituted by volatile and nonvolatile RAMs, such as DRAMs and NVRAMs. The RAM 107 is used not only as an area for retaining data temporarily needed when the CPU performs processing but also contains a self-diagnosis program of the present apparatus or a mailbox information table 107a and flags 107b according to the present invention. In the mailbox information table 107a, respective items of the F code are registered for the respective mailboxes provided in the mailbox area 108b.

A reading section 109 comprises a hardware for reading out an image from a document, such as a paper sheet, through the utilization of a CCD, etc., and converting it to electronic data. A printing section 110 compresses hardware for printing, on a paper sheet, image data received through the PSTN from other facsimile apparatuses and various maintenance information, etc., of the present apparatus. A network interface 111 comprises an interface connected to a communication network, such as a LAN, and allows data transfer to and from a communication apparatus such as a network server 112 and personal computer (PC) 113 on the network.

FIG. 2 is a view for showing an arrangement of the mailbox information table 107a by way of example.

The mailbox information table 107a stores a plurality of mailbox information items with a registration number 201 attached thereto. The mailbox information table 107a contains items of the registration number 201, subaddress 202, password 203, process type 204 and process-type information 205. Of these items, the F code shows one or more items of the subaddress 202, password 203, process type 204 and process-type information 205. Respective mailbox information shows an F code registered for a respective mailbox in a mailbox area 108b of the memory section 108.

The registration number 201 shows a sequential number starting with 1 and indicates a relation of the respective mailbox information to the respective mailbox in the mailbox area 108b of the memory section 108. The mailbox information of the registration number of 1, for example, represents an F code registered for a mailbox 1 (see FIG. 3).

The subaddress 202 is based on ITU-T Recommendations and specifies the respective mailbox information and is referred to so as to decide processing after reception. The subaddress 202 is used as a value set next to a normal facsimile number on the transmit side and transmitted with the facsimile number when the transmission of a facsimile.

The password 203 is based on ITU-T Recommendations and is used together with the above subaddress to decide processing after reception. The password 203 is used as a numerical value set next to the subaddress on the transmit side and transmitted with the subaddress and the facsimile number when the transmission of the facsimile. Whether or not the password is attached to the F code is arbitrary. Even if, on the transmit side, the subaddress and password are facsimile-transmitted together with image data, unless any password is registered on a receive side in a way to correspond to the subaddress, then the transmitted password is ignored on the receive side.

The process type 204 represents processing performed after receiving an F-code-attached facsimile, such as "confidential", "bulletin board" or "forwarding". The process-type information 205 is used to effect a specific setting for the process type 204. In the case of a mailbox for which forwarding processing is registered as, for example, the process type 204, the telephone number, etc., of a forwarding destination is stored there.

The reception record of the F-code-attached facsimile can be automatically printed on the printing section 110 or displayed on the display section or can be notified to a terminal connected to the LAN via the network interface 111. The reception record includes, for example, the reception time/date, registration number 201, subaddress 202 and process type 204.

The contents of a mailbox for which "bulletin board" is registered as the process type 204 can be printed by anyone at the printing section 110. The contents of a mailbox for which "confidential" is registered as the process type 204 can be printed at the printing section 110 by only a specific user knowing the password corresponding to the registration number 201 or subaddress 202. The contents of the mailbox for which "forwarding" is registered as the process type 204 are automatically forwarded to a facsimile apparatus of a facsimile number registered as the process-type information 205. The contents of the mailbox for which "network retaining" is registered as the process type 204 are transmitted to a server on the LAN through the network interface 111.

The mailbox information table 107a can be divided into a table T1 in which mailbox information of a registration number 1 is recorded and a table T2 in which mailbox information of any other registration numbers are registered. The table T1 is comprised of a table in which specific mailbox information is registered, noting that the specific mailbox information is referred to when a facsimile is received with a subaddress or password attached thereto but not registered in Table 2. This is an original feature of the present invention. For example, the table T1 is referred to when a facsimile (image data) is transmitted with an incorrect subaddress 202 or password on the transmit side, and is received on the receive side.

In one embodiment of the present invention, a facsimile can be transmitted with only the sub-address 202 of the F code attached as a transmitting destination or with the subaddress 202 and password 203 of the F code. The receive-side user, that is, the user of the facsimile transmission/reception apparatus, cannot change the setting (any others in FIG. 2) of the subaddress 202 and password 203 of the mailbox information (T1) of the registration number 1. The mailbox information (T2) of the next sequential registration numbers allows a change of the setting including the subaddress 202 and password 203 on the user side as in the conventional F-code-attached facsimile transmission/reception apparatus. Further, the user of the facsimile transmission/reception apparatus 100 can change the process type 204 or process-type information 205 in the tables T1 and T2.

FIG. 3 is a view showing an arrangement of the storage section 108.

The temporary storage area 108a is used to temporarily retain various setting information and image data in a received facsimile. The mailbox area 108b stores a plurality of mailboxes N (N=1, 2, 3, . . . ).

The mailbox can be divided into a mailbox 1 and a group 108C of any other mailboxes (mailboxes 2, 3, . . . ). The mailbox 1 is an area for retaining received image data, etc., corresponding to the mailbox information of the registration number 1. The mailbox 1 is used to store incorrect facsimile data when, for example, a facsimile is transmitted with an incorrect subaddress 202 or password on the transmit side. That is, when a facsimile is received with an attached F code having a subaddress or password not registered in the table T2 of the mailbox information table 107a, the mailbox 1 stores the image data of that facsimile.

When a facsimile is received with an attached F code having a subaddress and password registered in the table T2 of the mailbox information 107a, the corresponding mailboxe in the mailbox group 108c retain the image data in that facsimile. For example, the mailbox 2 is an area for, upon receipt of a facsimile with an attached F code having "001" set as a subaddress, retaining image data of that facsimile. Further, the mailbox 3 is an area which, upon receipt of a facsimile with an attached F code having 22222 set as a subaddress and 12345 set as a password, retains the image data of that facsimile.

The mailbox can retain various kinds of information of an F-code-attached facsimile including not only the image data but also a TSI representing a telephone number of a sender, a TSI name representing the name of a person or a company of the sender, and reception information such as the reception date and time.

The facsimile transmission/reception apparatus 100 according to one embodiment of the present invention has not only the function (function of printing received image information) of a normal G3 facsimile transmission/reception apparatus but also the specific mailbox setting function to be performed upon receipt of a facsimile with an attached F code not registered on the receiving apparatus, and enhances the reception capability of an F-code-attached facsimile.

Figure 4:
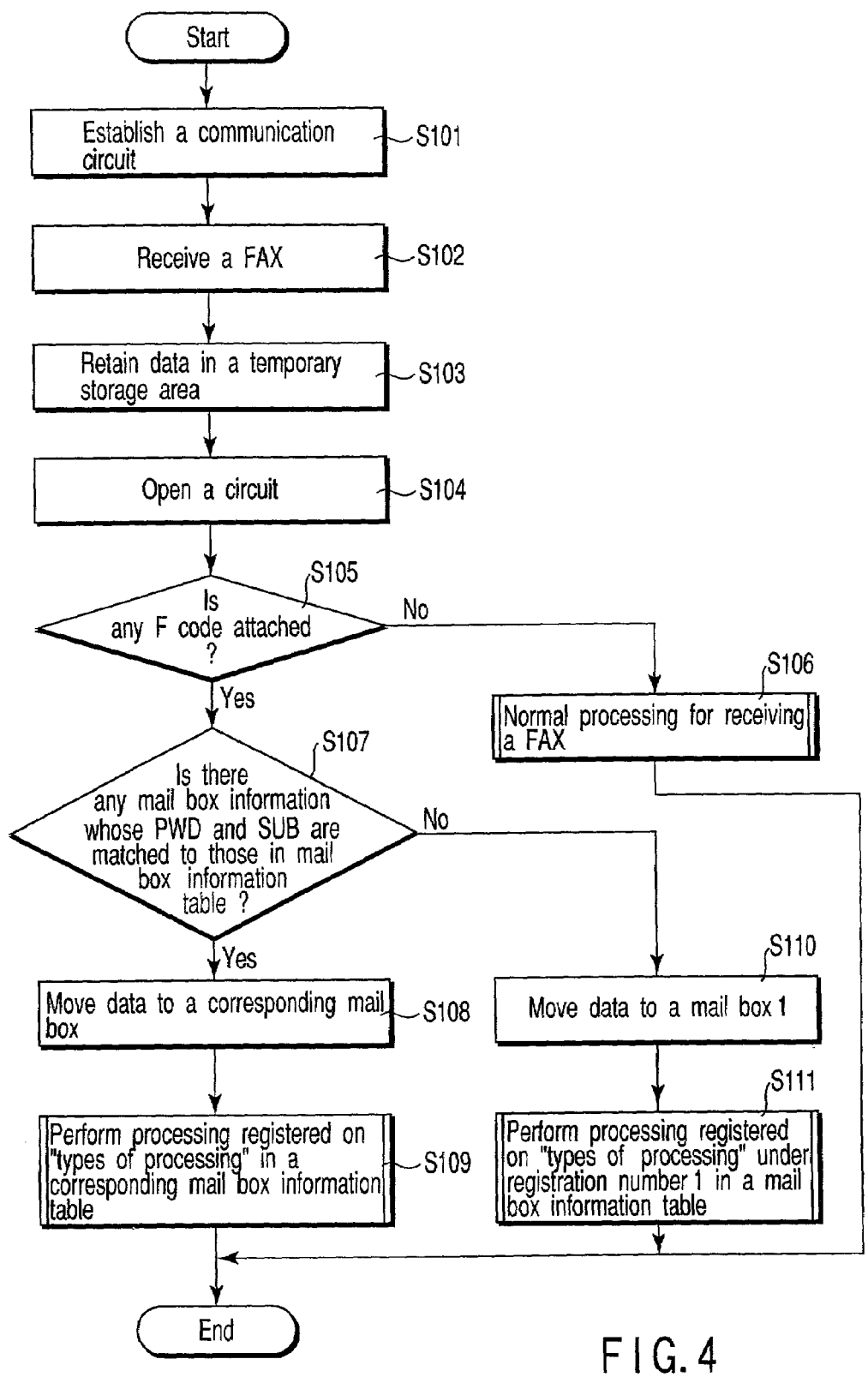
FIG. 4 is a flowchart showing processing done in the present facsimile transmission/reception apparatus when a facsimile is received.

FIG. 4 is a flow chart showing the processing performed in the present facsimile transmission/reception apparatus. This processing is controlled by the CPU 106.

When there is a facsimile incoming request from the PSTN, the CPU 106 of the facsimile transmission/reception apparatus 100 negotiates with the PSTN side and establishes a communication circuit as shown in step S101. If, at this time, an F code is attached to the facsimile, the CPU 106 sets a flag 107b indicating "F-code-attached" (see FIG. 1).

When, at step 102, a facsimile is received from the PSTN, the received data containing image data is retained in the storage section 108 at the temporary storage area 108a at step 102. At the completion of the facsimile reception, an associated circuit is opened at step S104. It is decided, at step S105, whether or not any F code is attached to the facsimile stored in the temporary storage area 108a. This decision is made by checking the flag 107b indicating "F code attached". If NO at step 105, control goes to step S106 and, if YES, control goes to step S107.

At step S106, as in the conventional G3 facsimile reception, print processing, etc., are performed using the printing section 110 and a sequence of receive processing is completed.

At step S107, a subaddress 202 and password 203 are taken out from the F code information of the received data stored in the temporary storage area 108a and it is decided whether or not any mailbox information having a subaddress and password matching those is registered in the table T2 of the mailbox information table 107a of the receiving machine. If there is no matching (if NO), control goes to step S110. If there is matched mailbox information (if YES), control goes to step 108.

At step S108, the facsimile data such as the image data is moved from the temporary storage area to a mailbox corresponding to that registration number. At step S109, processing is performed in accordance with the process type registered in the corresponding mailbox information and a sequence of facsimile receive operations is completed.

At step S110, the facsimile data of the image data, etc., is moved from the temporary storage area to the mailbox 1. At step S111, processing is performed in accordance with the process type set in the mailbox information of the registration number 1.

If "bulletin board" is registered as the process type 204 of the mailbox 1, the apparatus 100 is so set that, even if a password is received, anyone can print the contents of the mailbox 1 with the printing section 110. It should be noted that the contents of the mailbox 1 are overwritten on the previously stored contents.

If "network retaining" is registered as the process type 204 of the mailbox 1, the contents of the mailbox 1 are stored in a server on the LAN via the network interface 111. In this case, any number of F-code-attached facsimiles can be stored in the server and the respective facsimiles, together with their received time/date as well as their sequential number, are stored in the server in a mutually distinguishable way.

When such processing corresponding to the process type has performed, a sequence of facsimile reception processing is ended.

According to the embodiment of the present invention, as set out above, a special mailbox is provided for processing an F-code-attached facsimile having a subaddress and password not registered in the receiving apparatus and, by doing so, it is possible to receive a facsimile which is not able to be received by a conventional F-code-attached facsimile transmission/reception apparatus.

The same advantage as set out above can also be obtained through the procedure set out in connection with a "communication terminal apparatus" of Jpn. Pat. Appln. KOKAI Publication No. 2000-151961. According to the procedure of this publication, however, each time a facsimile with an attached F code not registered on the receiving machine is newly received, a mailbox is prepared. In the situation under which facsimiles are received often, there is a risk that the maximum number of mailboxes that can be prepared by the machine will be reached without it being known.

According to the present invention, only one special mailbox is initially prepared for processing a facsimile with an attached F code having a subaddress and password not registered on the receiving machine and it is, therefore, possible to avoid any situation under which the number of mailboxes is unduly increased.

Since, in the procedure of the above-mentioned publication, mailboxes are prepared one by one for different F codes, it has been difficult to promptly decide in which mailbox a facsimile with an attached F code not registered on the receiving machine has been stored. According to the procedure of the present invention it is possible to, by simply checking a special mailbox 1, obtain a facsimile with an attached F code not registered on the receiving machine.

The invention claimed is:

1. A communication terminal apparatus for receiving a facsimile with an attached F code containing a subaddress and performing processing corresponding to the subaddress, comprising:
   a first corresponding table which has respective registered processing corresponding to a respective subaddress;
   a plurality of first storage boxes which stores image data of a facsimile with an attached F code containing a subaddress registered in the first corresponding table;
   a second corresponding table which contains registered processing corresponding to a facsimile with an attached F code having a subaddress not registered in the first corresponding table;
   a second storage box which stores image data of the facsimile with an attached F code having a subaddress not registered in the first corresponding table;
   a receiving section which receives a facsimile via a communication circuit;
   a temporary storage section which temporarily stores the facsimile received by the receiving section;
   a first deciding section which decides whether or not any F code is contained in the facsimile stored in the temporary storage section;
   a second deciding section which, if an F code is contained in the facsimile, decides whether or not a subaddress in the F code is registered in the first corresponding table;
   a storage section which, if the subaddress in the F code is not registered in the first corresponding table, stores the image data of the facsimile stored in the temporary storage section into the second storage box; and
   a performing section which performs processing registered in the second corresponding table,
   wherein a password is registered in the first corresponding table in a way to correspond to the subaddress, and, if a password is contained in the F code, the second deciding section decides whether or not the password in the F code is registered in the first corresponding table, and, if the password in the F code is not registered in the first corresponding table, the storage section stores the image data of the facsimile in the second storage box.

2. An apparatus according to claim 1, wherein the processing corresponding to the subaddress includes bulletin board processing for allowing the stored image data to be accessible without a limit and the processing registered in the second corresponding table constitutes the bulletin board processing.

3. An apparatus according to claim 2, wherein the image data stored in the second storage box is overwritten on previously stored image data.

4. An apparatus according to claim 1, wherein the communication terminal apparatus is connected to a network server via a network, the processing corresponding to the subaddress includes network retaining processing for retaining a received facsimile via the network into the network server, and the processing registered in the second corresponding table constitutes the network retaining processing.

5. An apparatus according to claim 4, wherein the storage section adds image data of a received facsimile to the network server.

6. A communication terminal apparatus for receiving a facsimile with an attached F code containing a subaddress and performing processing corresponding to the subaddress, comprising:
   a first corresponding table which has respective registered processing corresponding to a respective subaddress;
   a plurality of first storage boxes which stores image data of a facsimile with an attached F code containing a subaddress registered in the first corresponding table;
   a second corresponding table which contains registered processing corresponding to a facsimile with an attached F code having a subaddress not registered in the first corresponding table;
   a second storage box which stores image data of the facsimile with an attached F code having a subaddress not registered in the first corresponding table;
   a receiving section which receives a facsimile via a communication circuit;
   a temporary storage section which temporarily stores the facsimile received by the receiving section;
   a first deciding section which decides whether or not any F code is contained in the facsimile stored in the temporary storage section;
   a second deciding section which, if an F code is contained in the facsimile, decides whether or not a subaddress in the F code is registered in the first corresponding table;
   a storage section which, if the subaddress in the F code is not registered in the first corresponding table, stores the image data of the facsimile stored in the temporary storage section into the second storage box; and
   a performing section which performs processing registered in the second corresponding table,
   wherein the processing corresponding to the subaddress includes bulletin board processing for allowing the stored image data to be accessible without a limit and the processing registered in the second corresponding table constitutes the bulletin board processing,
   wherein the password is registered in the first corresponding table in a way to correspond to the subaddress and, if the password is contained in the F code, the second deciding section decides whether or not the password in the F code is registered in the first corresponding table and, if the password in the F code is not registered in the first corresponding table, the storage section stores image data of the facsimile in the second storage box, and the performing section performs the bulletin board processing and the image data is allowed to be accessible without a limit irrespective of the password.

7. A receiving data processing method for use in a communication terminal apparatus for receiving a facsimile with an attached F code containing a subaddress and performing processing corresponding to the subaddress, comprising:
   receiving a facsimile via a communication circuit;
   deciding whether or not any F code is contained in the received facsimile;
   if an F code is contained in the facsimile, deciding whether or not a subaddress in the F code is registered in a first corresponding table;
   if the subaddress in the F code is registered in the first corresponding table, storing image data of the facsimile in a storage box of a plurality of first storage boxes which corresponds to the subaddress and performing the processing corresponding to the subaddress; and, if the subaddress of the F code is not registered in the first corresponding table, storing image data of the facsimile in a second storage box and performing predetermined processing registered in a second corresponding table different from the first corresponding table, wherein said first corresponding table allows a password to be registered in a way to correspond to the subaddress, and further comprising the steps of, if a password is contained in the F code of the received facsimile, deciding whether or not the password is registered in said first corresponding table and, if the password is not registered in said first corresponding table, storing the image data of the received facsimile in the second storage box.

8. A receiving data processing method for use in a communication terminal apparatus for receiving a facsimile with an attached F code containing a subaddress and performing processing corresponding to the subaddress, comprising:

receiving a facsimile via a communication circuit;

deciding whether or not any F code is contained in the received facsimile;

if an F code is contained in the facsimile, deciding whether or not a subaddress in the F code is registered in a first corresponding table;

if the subaddress in the F code is registered in the first corresponding table, storing image data of the facsimile in a storage box of a plurality of first storage boxes which corresponds to the subaddress and performing the processing corresponding to the subaddress; and.

if the subaddress of the F code is not registered in the first corresponding table, storing image data of the facsimile in a second storage box and performing predetermined processing registered in a second corresponding table different from the first corresponding table, wherein the communication terminal apparatus is connected via a network to a network server and said predetermined processing constitutes network retaining processing for retaining the received facsimile via the network in said network server, wherein said first corresponding table allows a password to be registered in a way to correspond to the subaddress, and further comprising the steps of, if a password is contained in the F code of the received facsimile, deciding whether or not said password is registered in said first corresponding table and, if said password is not registered in said first corresponding table, storing the image data of the received facsimile in the second storage box wherein the image data is retained in the network server irrespective of said password.

* * * * *